United States Patent
Björkegren et al.

(10) Patent No.: US 8,862,175 B2
(45) Date of Patent: Oct. 14, 2014

(54) CORRECTION OF ESTIMATED SIR USED FOR TRANSMIT POWER CONTROL

(75) Inventors: Häkan B. Björkegren, Töby (SE); Jing Rao, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 289 days.

(21) Appl. No.: 13/516,885

(22) PCT Filed: Dec. 29, 2009

(86) PCT No.: PCT/SE2009/051512
§ 371 (c)(1),
(2), (4) Date: Jun. 18, 2012

(87) PCT Pub. No.: WO2011/081581
PCT Pub. Date: Jul. 7, 2011

(65) Prior Publication Data
US 2012/0258763 A1 Oct. 11, 2012

(51) Int. Cl.
*H04B 7/00* (2006.01)
*H04W 52/12* (2009.01)
*H04W 52/24* (2009.01)

(52) U.S. Cl.
CPC ............ *H04W 52/12* (2013.01); *H04W 52/246* (2013.01); *H04W 52/243* (2013.01)
USPC ............. 455/522; 455/69; 455/500; 455/517; 455/67.11; 455/507; 370/328; 370/329; 370/343; 370/338

(58) Field of Classification Search
CPC ........................ H04W 52/246; H04W 52/243
USPC .......... 455/522, 69, 68, 127.1, 500, 517, 509, 455/67.11, 507, 511, 515, 550.1, 445, 455/426.1, 426.2, 403; 370/328, 329, 343, 370/338
See application file for complete search history.

(56) References Cited

U.S. PATENT DOCUMENTS

| | | | |
|---|---|---|---|
| 2005/0201447 A1 | 9/2005 | Cairns et al. | |
| 2005/0281358 A1 | 12/2005 | Bottomley et al. | |
| 2009/0190485 A1 | 7/2009 | Bjorkegren et al. | |
| 2011/0075706 A1* | 3/2011 | Cairns et al. | 375/144 |

FOREIGN PATENT DOCUMENTS

| | | |
|---|---|---|
| EP | 1892860 A2 | 2/2008 |
| GB | 2373135 A | 9/2002 |

(Continued)

OTHER PUBLICATIONS

Bottomley, Gregory. "A Generalized RAKE Receiver for Interference Suppression." IEEE Journal on Selected Areas in Communications; Aug. 2000; pp. 1536-1545; vol. 18. No. 8.

*Primary Examiner* — Keith Ferguson
(74) *Attorney, Agent, or Firm* — Coats & Bennett, PLLC

(57) ABSTRACT

The present invention provides a method which performs an estimation of a SIR as basis for transmit power control. The SIR estimation is performed for a radio signal (u) which is transmitted from a transmitter (35) to a receiver (43) over a radio channel (37). A channel estimate h and a combining weight w are first obtained (83). Then an estimated SIR value is generated (85) based at least in part on the channel estimate h and the combining weight w. The estimated SIR value is generated such that it equals a first estimated SIR value multiplied by a numerical factor. The numerical factor is dependent on the channel estimate h and the combining weight w in a manner such that it attains a minimum value whenever the channel estimate h and the combining weight w are linearly dependent. The invention also comprises devices for carrying out the method.

20 Claims, 5 Drawing Sheets

(56) References Cited

FOREIGN PATENT DOCUMENTS

| WO | 9946869 | A | 9/1999 |
| WO | 2004051902 | A1 | 6/2004 |
| WO | 2008057018 | A1 | 5/2008 |

\* cited by examiner

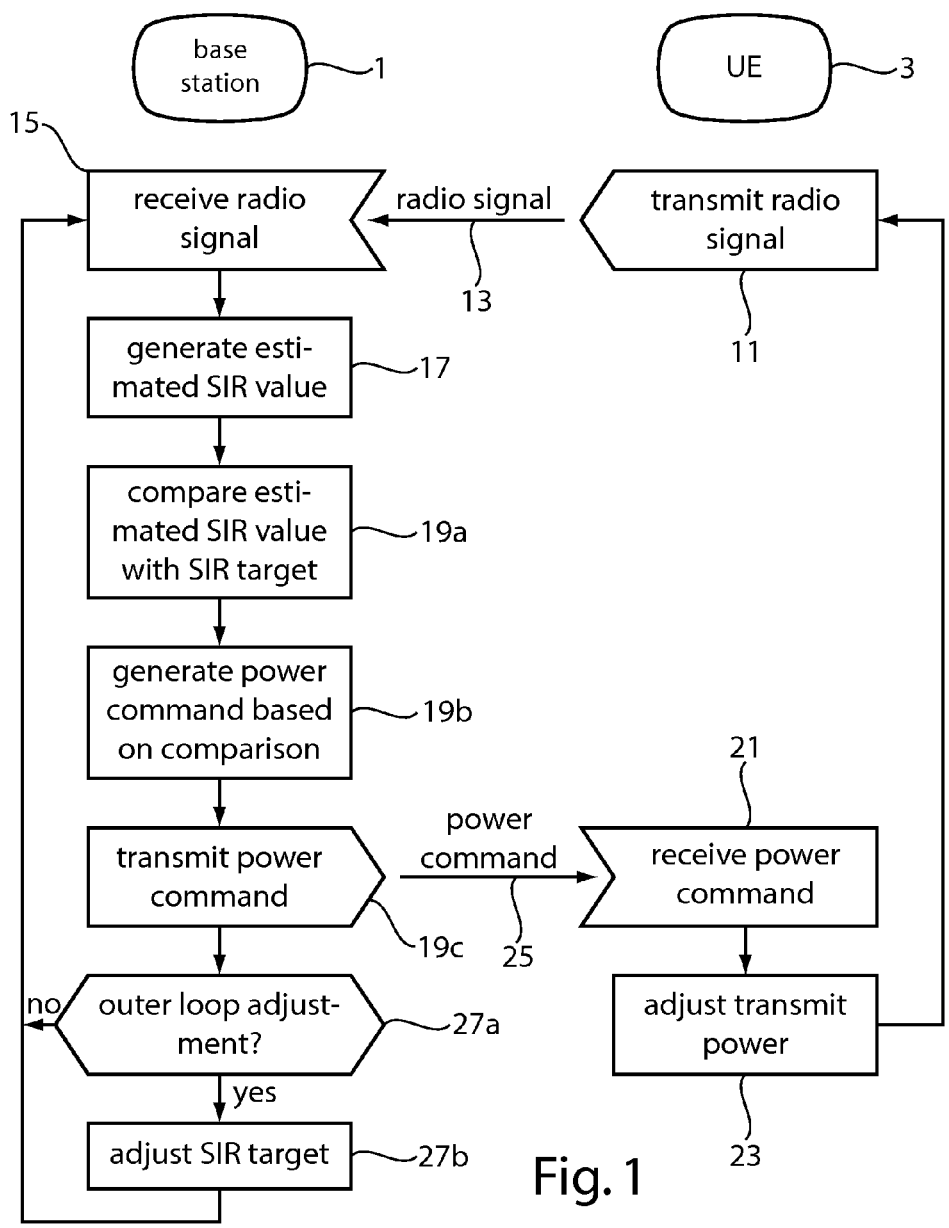
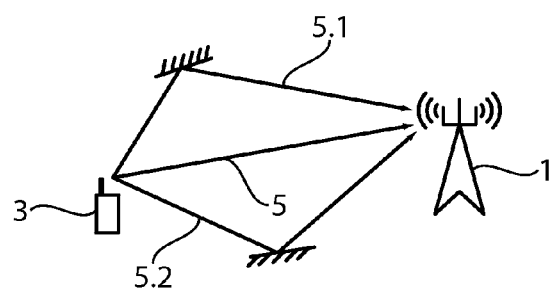

E-TFCI = 126
| PC method | Throughput (Mbps) |
|---|---|
| Modified rscp/interference | 5.16 |
| p-over-variance | 5.06 |
| p-over-beta | 5.02 |
| GRAKE SIR | 5.25 |
Fig. 8
E-TFCI = 42
| PC method | Throughput (Kbps) |
|---|---|
| Modified rscp/interference | 247 |
| p-over-variance | 242 |
| p-over-beta | 241 |
| GRAKE SIR | 251 |
Fig. 9
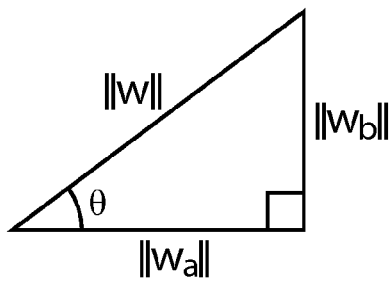
Fig. 10
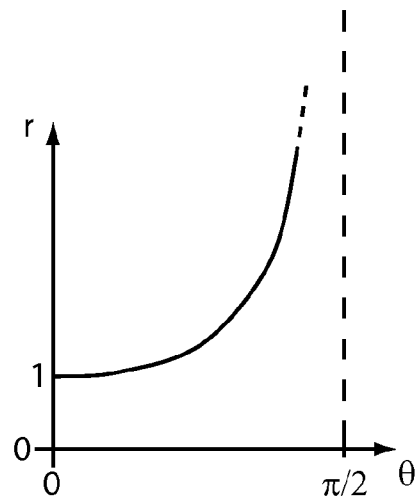
Fig. 11

CORRECTION OF ESTIMATED SIR USED FOR TRANSMIT POWER CONTROL

TECHNICAL FIELD

The present invention pertains in general the field of wireless communications; and in particular to the part this field which is related to power control of radio transmissions.

BACKGROUND

In most wireless communication systems, e.g. cellular communication systems, some form of transmit power control is usually necessary in order to use radio resources in an efficient manner while providing a desirable quality of service. For example, in the current UMTS (Universal Mobile Telecommunication System) standard, an uplink transmit power control procedure simultaneously controls a power of a DPCCH (Dedicated Physical Control Channel) and its corresponding DPDCHs (Dedicated Physical Data Channels), if present, a HS-DPCCH (High Speed Dedicated Physical Control Channel), if present, E-DPDCHs (Enhanced Uplink Dedicated Physical Data Channels), if present, and E-DPCCH (Enhanced Dedicated Physical Control Channel), if present. The transmit power control with respect to a UE (User Equipment) comprises an outer-loop power control and an inner-loop power control. While the outer-loop power control adjusts a SIR (Signal-to-Interference-Ratio) target in order to obtain a certain QoS (Quality of Service), the inner-loop power control compares the SIR target with a SIR estimate and generates TPC (Transmit Power Control) commands to inform the UE either to increase or to decrease the transmission signal power.

There are various known methods for performing SIR estimation for the purpose of power control, including in particular: P-over-variance SIR, P-over-beta SIR and GRAKE SIR.

P-over-variance SIR estimate is determined according to $$SIR = \frac{P_{pilots}}{\text{filtered var(pilots)}} - a/N_{pilot}. \quad (1)$$

$P_{pilots}$ denotes a received power on pilots. var(pilots) is a variance of the pilots and represents a total interference including white noise, interference from other users and self-interference. The variance var(pilots) is filtered through a smoothing filter before it is used in equation (1). $a/N_{pilot}$ is a so-called bias removal term, where $N_{pilot}$ denotes a number pilots per slot, and where a is a predetermined positive value, which depends on $N_{pilot}$.

GRAKE (Generalised RAKE (receiver)) SIR estimation is determined according to $$SIR = \frac{|w^H \cdot h|^2}{w^H \cdot Ru \cdot w}. \quad (3)$$

Here, h is a channel estimate, Ru is an impairment matrix and w is a combing weight. The channel estimate h is here viewed as a complex valued column vector ($h \in C^{M \times 1}$), so that $$h = \begin{pmatrix} h_1 \\ \vdots \\ h_M \end{pmatrix}.$$

Where M is the number of multi-path components in the channel; M may vary over time. If several antennas are used for receiving the same signal, then each antenna will of course give rise to components in the channel estimate h. In equation (3), the superscript H denotes Hermitian transpose, that is, a conventional matrix transpose combined with complex conjugation of the matrix elements, and the dot denotes matrix multiplication. The channel estimate h may conveniently be thought of as discrete FIR filter modelling an influence of a multi-path radio channel on a transmitted signal. Each component $h_i$ of the channel estimate h consequently constitutes a filter tap. The channel estimate h is normally obtained from a received signal by using known information, e.g. pilots, which has been included in the signal when transmitted. Let y be a column vector that represents a received signal corresponding to one transmitted symbol s which is as complex number, then y is related to s by y=hs+n', where n' is a complex column vector representing noise, including thermal/background noise, interference form other radio transmitters and self-interference. The impairment matrix Ru ∈ $C^{M \times M}$ is a covariance matrix of the noise vector n', that is, $Ru = E(n' \cdot n'^H)$, where E denotes an expected value. The impairment matrix Ru may be calculated using various approaches. For example, one approach is model based, called parametric GRAKE; another approach is non-model based, called non-parametric GRAKE. Parametric GRAKE estimates Ru mainly based on the channel estimate h and channel delays. Non parametric GRAKE estimates Ru based on the received y and, for instance, unused spreading codes. Once an estimate of the impairment matrix Ru has been obtained, the combining weight $w \in C^{M \times 1}$ is calculated based on the impairment matrix and the channel estimate according to $w = Ru^{-1} \cdot h$. The combining weight w is thereafter used to produce a receiver demodulator output $w^H \cdot y$, often referred to as soft information, which is used for decoding. Above, the notation $C^{I \times J}$ is used denote the set of all complex valued I×J matrices for any choice of positive integers I and J. A good introduction to GRAKE techniques can be found, for example, in G. E. Bottomley, T. Ottosson and Y.-P. E. Wang, "A generalized RAKE receiver for interference suppression", IEEE J. sel Areas Commun., vol. 18, August 2000.

In the P-over-beta SIR method, a real-valued parameter, herein denoted β (beta), which is a measure of an interference power generated by other users and thermal/background noise, is used. Note that β does not take self-interference into account.

Therefore, this approach tries to eliminate inter-symbol interference impact on the SIR estimation. The parameter β can be obtained using different methods. For instance, parametric GRAKE provides a measure of β for each slot using a model $$Ru = \alpha Rsi + \beta Rn,$$

where Rsi and Rn are matrices that are obtained based on the channel estimate h and RAKE finger delays. The parameters α and β are estimated from the model using a least square approach.

The parameter β is also filtered with a similar smoothing filter as the filter used in the above-mentioned p-over-variance method. The P-over-beta SIR estimate is determined according to $$SIR = \frac{P_{pilots}}{\text{filtered }(\beta)} - b/N_{pilot} \quad (2)$$

Here $b/N_{pilot}$ is again a bias removal term, where b is a predetermined positive value.

Each SIR estimation method is associated with its own power control behaviour, and the selection of SIR estimation method thus has an important impact on system performance.

Studies have shown that both p-over-variance SIR and p-over-beta SIR have large variance at lower SIR. In general, GRAKE SIR has smallest variance compared with p-over-variance SIR and p-over-beta SIR.

At a higher SIR operating point, multi-path propagation in combination with high transmission power may cause severe self-interference, and in some cases this self-interference may be the dominating source of interference. When self-interference is dominant, a received SIR may not be able to reach the SIR target, irrespective of what transmit power the UE uses. This is due to the fact that increasing the transmission power will also increase the self-interference, and thus the resulting SIR may not be improved as expected. In this case, the inner-loop power control will continue to ask the UE to increase its transmit power, and this will lead to an undesirable power rush, which may lead to system instability, and serious interference also to other system users.

As mentioned above, the p-over-beta SIR method tries to exclude self-interference from the total interference and this method is believed to be able to perform best in cases with dominant self-interference. However, studies have shown that the p-over-beta SIR method cannot completely eliminate self-interference from the total interference. Therefore, occurrences of the above-described power rushes cannot be ruled out altogether.

The GRAKE SIR method is regarded as a good candidate for power control methods, since it has a high accuracy and does not require filtering, which allows the method to follow interference changes quickly. However, self-interference still limits its performance in a context of power control.

Consequently, a problem addressed by the present invention is to overcome or at least mitigate the above-indicated difficulties relating to SIR estimation and power control.

SUMMARY

According to one aspect of the present invention, the above-indicated problem is solved with a method which performs an estimation of a SIR as a basis for transmit power control. The SIR estimation is performed for a radio signal which is transmitted from a transmitter to a receiver over a radio channel. A channel estimate h and a combining weight w are first obtained. Then an estimated SIR value is generated based at least in part on the channel estimate h and the combining weight w. The estimated SIR value is generated such that it equals a first estimated SIR value multiplied by a numerical factor. The numerical factor is dependent on the channel estimate h and the combining weight w in a manner such that it attains a minimum value whenever the channel estimate h and the combining weight w are linearly dependent.

According to another aspect of the invention, the above-stated problem is solved with a device which is capable of performing the above-indicated method, and the invention comprises also a base station comprising such a device.

A main advantage of the invention is that it provides an estimated SIR value which is highly suitable for use in transmit power control of the transmitter, especially in situations where the transmitter is self-interference limited. The introduced numerical factor will have a tendency to enlarge the estimated SIR value when self-interference is significant relative to situations when there is no or low self-interference. This will increase a robustness of the power control by reducing a risk for the above-mentioned power rushes. As will be discussed in greater detail below, simulations have shown that significant capacity gains can be achieved by using estimated SIR values according to the invention.

The invention will now be described further using exemplary embodiments and referring to the drawings. A person skilled in the art will appreciate that further objects and advantages may be associated with these exemplary embodiments of the invention.

BRIEF DESCRIPTION OF THE DRAWINGS

FIG. 1 is flowchart illustrating conventional power control of radio transmissions.

FIG. 2 is a schematic view illustrating multi-path propagation of radio signals from a UE to a base station.

FIG. 8 is table illustrating data throughput for an embodiment of the invention and prior art methods in accordance with a simulated higher data rate case.

FIG. 9 is table illustrating data throughput for an embodiment of the invention and prior art methods in accordance with a simulated lower data rate case.

FIG. 10 is a trigonometric diagram illustrating an introduction of a measure of angle between a combining weight and a channel estimate.

FIG. 11 is a diagram illustrating a relationship between a particular ratio and said measure of angle.

DETAILED DESCRIPTION

Figure 3:
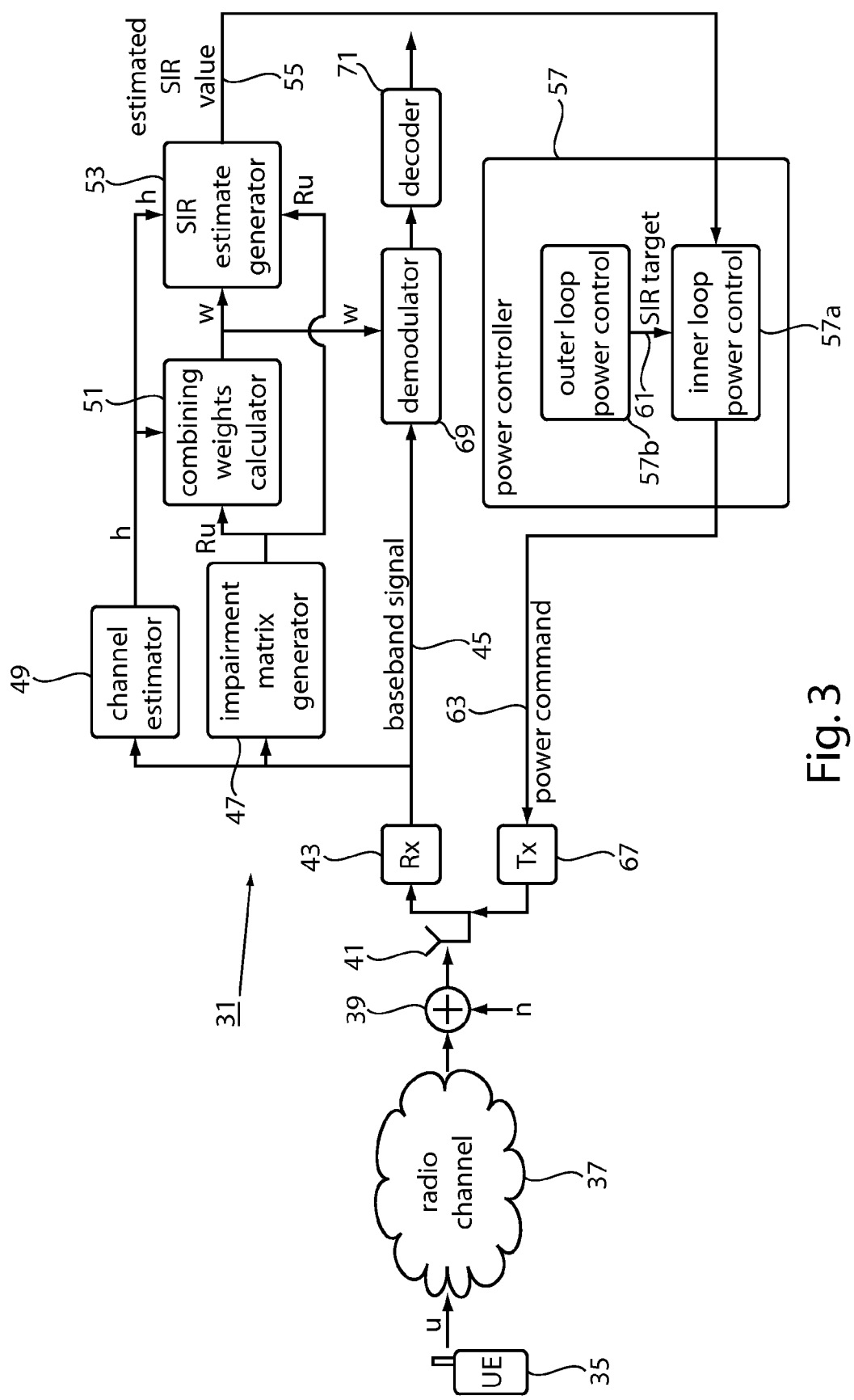
FIG. 3 is a block diagram illustrating an exemplary communication situation where embodiments of the invention may be employed.

FIG. 1 is a flowchart that illustrates an example of conventional (uplink) transmit power control, where a base station 1 is responsible for controlling an uplink transmit power from a UE 3. Actions performed by the base station 1 are shown to the left, and actions performed by the UE 3 are shown to right. At a block 11, the UE 3 transmits an uplink radio signal 13 to the base station 1, which receives the radio signal 13 at a block 15. Based on the received radio signal 13, the base station 1 generates an estimated SIR value at a block 17. Then, at blocks 19a-19c, the base station 1 uses the estimated SIR value in an inner loop power control procedure. At the block 19a, the base station 1 compares the estimated SIR value with a SIR target. Based on this comparison, the base station 1 generates a power command 25 at the block 19b. For example, if the estimated SIR value is below the SIR target, the power command may indicate that an increase in transit power is to be made, otherwise the power command may indicate that a decrease in transmit power is to be made. The base station 1 then transmits the power command 25, e.g. over a control channel, to the UE 3 at a block 19c. The UE 3 receives the power command 25 at a block 21 and adjusts its transmit power in accordance with the power command 25 at a block 23. The adjusted transmit power is then used for transmitting the radio signal 13 to the base station 1. In FIG. 1, the base station 1 also performs an outer loop power control at blocks 27a and 27b. At the block 27a, the base station 1 determines whether an outer loop adjustment is to be made at the present. Note that the outer loop adjustment is normally performed much less frequently than the inner loop adjustment. If it is determined that an outer loop adjustment is to be made, the SIR target is adjusted at the block 27b. If the SIR target is adjusted, the inner loop power control is performed using the adjusted SIR target, otherwise the inner loop power control is performed with the old (unadjusted) SIR target.

FIG. 2 is a schematic view that illustrates a difficulty relating to conventional power control, namely self-interference caused by multi-path propagation. FIG. 2 illustrates how a radio signal transmitted from the UE 3 reaches the base station 1 via several propagation paths, due to reflections from various objects in the surroundings. In this example, the radio signal reaches the base station 1 via a direct path 5 as well as via two reflected paths 5.1 and 5.2, respectively. The signals received over the reflected paths 5.1 and 5.2 will appear as interference on the signal received over the direct path 5. The base station 1 will then order an increase in the transmit power from the UE 3. However, an increase in the transmit power will not overcome the self-interference, since the increase in transmit power will increase the signal power associated with each propagation path. The inner loop power control may therefore result in a series of power increases—a power rush—without improving the SIR. This leads to an unnecessarily high transmit power from the UE, which puts an undue strain on the UE's 3 power resources and increases an overall interference level in the wireless communication system. Embodiments of the present invention, however, provide ways and means to overcome or at least mitigate this difficulty.

FIG. 3 is a block diagram which illustrates a, purely exemplary, situation where embodiments of the present may be advantageously employed. In FIG. 3, a UE 35 transmits an uplink radio signal u to a base station 31 of a RAN (Radio Access Network) via a (multi-path) radio channel 37. Noise n is also added to the signal u; this is here symbolically illustrated with an addition block 39. The noise n may comprise background/thermal noise as well as noise/interference generated by other transmitters. The person skilled in the art will appreciate that the base station 31 is simplified in that it shows mainly features that relate to embodiments of the invention, so that many well known details of base station design are left out in order to not obscure the presentation with unnecessary details. The base station 31 receives the signal u via an antenna 41 and a receiver unit 43, which outputs a base band signal 45 corresponding to the transmitted signal u. The base station 31 also comprises a channel estimator 49, which generates a channel estimate h associated with the radio channel 37 over which the signal u is transmitted, and a impairment matrix generator 47, which generates an impairment matrix Ru associated with the signal u. A combining weights calculator 51 is operatively connected to the channel estimator 49 and the impairment matrix generator 47 and adapted to receive the channel estimate h and the impairment matrix Ru. The combining weights calculator 51 calculates a combining weight w based on the impairment matrix Ru and the channels estimate h. The received base band signal is fed to a demodulator 69, which is also operatively connected to the combining weights calculator 51 for receiving the combining weight w.

The demodulator 69 is adapted to demodulate the base band signal 45 using the combining weight w for weights combining. The type of demodulator used depends on the type of system the base station 31 is designed to operate in. For example, in a CDMA (Code Division Multiple Access) system, the demodulator may be RAKE or a GRAKE based demodulator, and in an OFDMA (Orthogonal Frequency Division Multiple Access) system, the demodulator may be a DFT/FFT (Discrete Fourier Transform/Fast Fourier Transform) based demodulator. A demodulated signal generated by the demodulator 69 is then fed to a decoder 71 for decoding. The base station 31 also comprises a SIR estimate generator 53, which is adapted to generate an estimated SIR value 55, which is used in transmit power control of the UE 35. In this particular example, it is assumed that the SIR estimate generator 53 determines the estimated SIR value 55 in accordance with one particular embodiment of the invention (modified rscp-over-interference), which will soon be described. This entails that the estimated SIR value is determined based on the channel estimate h, the impairment matrix Ru and the combining weight w. However, the person skilled in the art will appreciate that the base station 31 and the SIR estimate generator 53 can easily be modified to determine the estimated SIR value in accordance with other embodiments of the invention, which embodiments will described in detail below. The base station 31 further comprises a power controller 57 with an inner loop power control unit 57a and an outer loop power control unit 57b. The inner loop power control unit 57a is operatively connected to the SIR estimate generator 53 for receiving the estimated SIR value 55, which the inner loop control unit 57a compares with a SIR target 61 provided by the outer loop power control unit 57b. Based on this comparison, the inner loop power control unit 57a generates a power command 61, which the base station 31 transmits to the UE 35 using a transmitting unit 67. In response to receiving the power command 61, the UE 35 adjusts its transmit power in accordance with the power command 61.

According to one embodiment of the present invention, a method of generating an improved SIR estimate particularly suited for use in transmit power control is suggested, which method will be referred to herein as modified rscp-over-interference SIR estimation. Here, rscp stands for received signal coded power.

The modified rscp-over-interference SIR estimate is determined according to $$SIR = \frac{\|h\|^2}{(w^H \cdot Ru \cdot w)/\|w\|^2} = \frac{\|h\|^2 \cdot \|w\|^2}{w^H \cdot Ru \cdot w}. \quad (4)$$

The squared norm $\|h\|^2$ of the net channel estimate h represents the above-mentioned DPCCH received signal coded power (rscp). The norm used here is the Euclidian norm. In particular embodiments, the combining weight w and the impairment matrix Ru can be obtained either from non-parametric GRAKE or parametric GRAKE models. The expression $w^H \cdot Ru \cdot w$ can be viewed as an estimate of a perceived interference after GRAKE combining. This perceived interference is, however, scaled down with factor $\|w\|^{-2}$ to counteract a scaling effect introduced by the combining weight w.

Since the modified rscp-over-interference method makes use of the same parameters as the GRAKE SIR method, it is instructive to compare the two methods. Both methods can be said to estimate the interference after weights combining. In this way, a receiver's inherent ability to suppress interference is taken into account, in contrast to the p-over-variance method where SIR is measured before RAKE combining. This makes the interference estimate a more accurate measure of an input quality to a decoder. However, the modified rscp-over-interference method also gets rid of the scaling factor of the combining weight w through the above-mentioned downscaling. The modified rscp-over-interference method is also different from the GRAKE SIR method in that it estimates the received signal power directly on a pilots symbol before weights combining. However, the best comparison of the two methods is perhaps obtained by investigating directly the mathematical relationship between the two methods. Comparing equation (3) and equation (4) gives modified rscp-over-interference SIR=$K$*GRAKE SIR,    (5)

where $K=\|h\|^2 \cdot \|w\|^2/|w^H \cdot h|^2$.

It can be shown (e.g. as an application of the Cauchy-Schwarz inequality) that $K \geq 1$, so that modified rscp-over-interference SIR≥GRAKE SIR.

The factor K attains the minimum value of one if the channel estimate h and the combining weight w are linearly dependent, that is, if w=kh for some complex value k, or put differently, when the combining weight w is in the linear span of the channel estimate h. This is highly advantageous, since the condition w=kh implies that there is only white interference present, in which case the impairment matrix is proportional to a unit matrix. If, on the other hand, there is lots of self-interference and/or coloured interference from other users present, then K>>1. This characteristic will reduce the tendency for power rushes, since the modified rscp-over-interference method in these situations will automatically generate an estimated SIR value which in a sense is kept artificially high (compared to the GRAKE SIR method) through the introduction of the factor K.

Equation (5) is clearly suggestive of more generic embodiments. In these embodiments, an estimated SIR value for use in power control is determined according to

SIR=$N$*SIR1.    (6)

SIR1 is here intended as a first estimated SIR value, which may be in accordance with any conventional SIR estimation method, and in particular in accordance with any one of the above-mentioned SIR estimation methods, that is, GRAKE SIR, p-over-variance SIR or p-over-beta SIR. N is a numerical factor that is introduced in order to improve a robustness of the power control, especially with respect to power rushes caused by self-interference. In exemplary embodiments, the numerical factor N is dependent on the channel estimate h and the combining weight w in such way that the numerical factor N has minimum value whenever the combining weight and the channel estimate are linearly dependent, that is, whenever w=kh for some complex value k. Preferably, the minimum value of the numerical factor N is equal to or greater than one. The factor N will then have the effect of selectively enlarging the estimated SIR value relative to the first estimated SIR value SIR1, and the effect is guaranteed when self-interference is present. It is not excluded that the minimum value is less than one, but if this is the case, it is advised that the minimum value is nevertheless fairly close to one. In some embodiments, the numerical factor N may be defined as function of a ratio $r=\|h\| \cdot \|w\|/|w^H \cdot h|$. That is, N=F(r) for some specified real valued function F, which preferably is an increasing function. Of course, the function F may be defined on some superset of the interval [1, ∞[. For example, in one embodiment, F may be the mapping r↦ $br^c$, where b and c are positive real constants.

The ratio r has a mathematical behaviour that makes it clearly suitable as a basis for the numerical factor N, as is illustrated in FIGS. 10 and 11. Let L(h) denote the linear span of the channel estimate h (i.e. L(h)={zh:z ∈ C}, where C is the set of complex numbers) and let L(h)$^\perp$ denote the orthogonal complement of the linear span L(h) (i.e. L(h)$^\perp$={v ∈ $C^{M \times 1}$: (∀x ∈ L(h)) ($v^H \cdot x=0$)}). As any text on linear algebra will explain, the combining weight w can be decomposed in a unique way such that w=$w_a$+$w_b$, where $w_a$ ∈ L(h) and $w_b$ ∈ L(h)$^\perp$. Furthermore, this decomposition fulfils the Pythagorean theorem, that is, $\|w\|^2=\|w_a\|^2+\|w_b\|^2$. Therefore, as is illustrated with a trigonometric diagram in FIG. 10, it is possible to introduce a sort of angle θ between the combining weight w and the channel estimate h. The angle θ can, for example, be defined according to θ=arccos($\|w_a\|/\|w\|$). FIG. 11 is a diagram illustrating a relationship between the ratio r and the angle θ—note that r=$\|w\|/\|w_a\|$. When θ is zero, r attains its minimum value, which is one. This corresponds to a situation where the combining weight w is entirely in the linear span of h, such that w=kh for some complex value k. For other values of θ, r is greater than one; and r approaches infinity when θ approaches π/2, representing a situation where w is orthogonal to h.

A person skilled in the art will appreciate that the above-mentioned modified rscp-over-interference method is a special case of the embodiments represented by equation (6), that is, by selecting N=$r^2$ and SIR1=GRAKE SIR.

Figure 4:
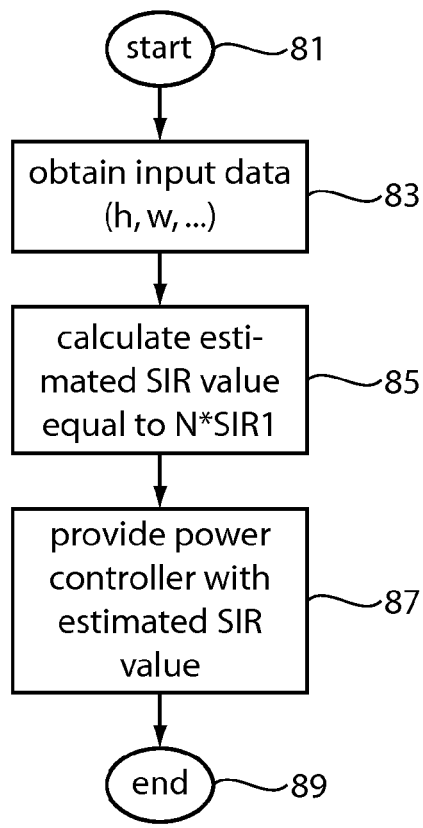
FIG. 4 is flowchart illustrating SIR estimation in accordance with exemplary embodiments of the invention.

FIG. 4 is a flowchart that illustrates a method for SIR estimation of power control in accordance with embodiments of the present invention. After a start 81, input data is obtained at a block 83. The input data comprise a channel estimate h and a combining weight w. The input data may include further items depending on the precise method used for SIR estimation. For example, the input data may in particular embodiments comprise an impairment matrix and/or other parameters used in conventional SIR estimation as a part of the process. At a block 85, using the obtained input data, an estimated SIR value is calculated as N*SIR1, where N and SIR1 are as above. Once the estimated SIR value has been calculated, the estimated SIR value is provided, at a block 87, to a power controller for use in power control of the transmitter to which SIR estimation relates. After the block 87 the method ends at a block 89, but of course, the method may be repeated any number of times so as to produce a sequence of estimated SIR values.

Figure 5:
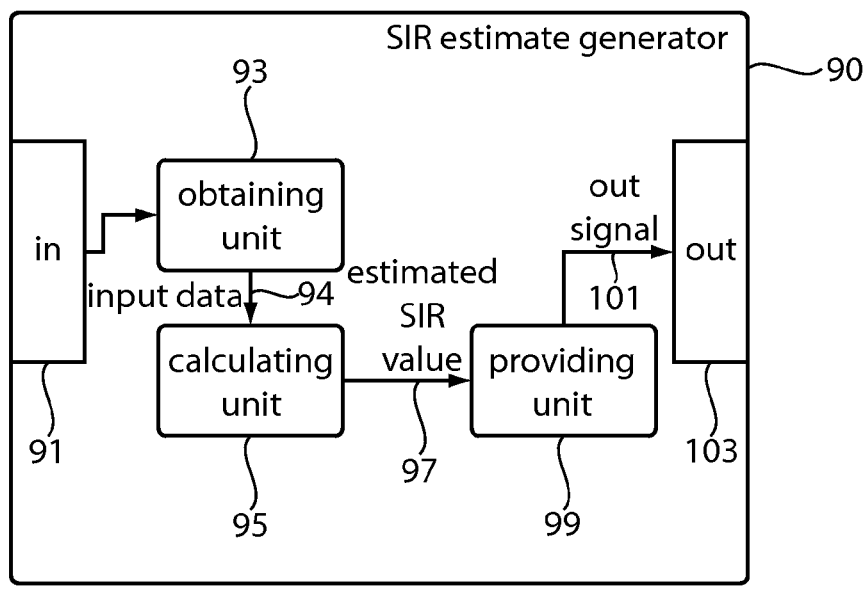
FIG. 5 is a block diagram illustrating a SIR estimate generator according to an embodiment of the invention.

FIG. 5 is a block diagram illustrating a SIR estimate generator 90, that is, a device for generating an estimated SIR value for use in power control, in accordance with an embodiment of the invention. The SIR estimate generator 90 comprises input interface equipment 91 to which an obtaining unit 93 is operatively connected. The obtaining unit 93 is adapted to obtain the input data 94 mentioned at the block 83 of the method described in FIG. 4. The obtaining unit 93 may obtain the input data 94, via the input interface equipment 91, from devices external to the SIR estimate generator 90. Alternatively, the obtaining unit 93 may be adapted to generate itself one or more items of the input data. The obtaining unit 93 is operatively connected to a calculating unit 95 and adapted to send the input data 94 to the calculating unit 95. The calculating unit 95 is adapted to calculate an estimated SIR value 97 based on the input data. The calculating unit 95 may be adapted to calculate the estimated SIR value using any one of the embodiment SIR estimation methods disclosed and indicated above. The calculating unit 95 is operatively connected to a providing unit 99 and adapted to send the estimated SIR value 97 to the providing unit 99, which is then adapted to provide a power controller with the estimated SIR value 97. In this exemplary embodiment, the providing unit 99 is adapted to provide the power controller with the estimated SIR value 97 by generating an appropriate out signal 101, which carries information about the estimated SIR value 97. The out signal 101 is sent to the power controller via output interface equipment 103.

A person skilled in the art will appreciate that the units of the SIR estimate generator 90 may be implemented using standard circuit technologies, which exist in profusion. For example, the units may be implemented using application specific circuitry (e.g. ASIC), discrete components or programmable circuitry, or any combination thereof. The person skilled in the art will also appreciate that the functions performed by the units of the SIR estimate generator 90 may also be fully or partially implemented using one or more processors programmed with suitable software. The units of the of the SIR estimate generator 90 do not have to be physically separate; for example, two or more units may be implemented on the same circuit board. Furthermore, the functions performed by any one of the units of the SIR estimate generator 90 do not have to be performed at one location but can instead be performed in a distributed manner.

Figure 6:
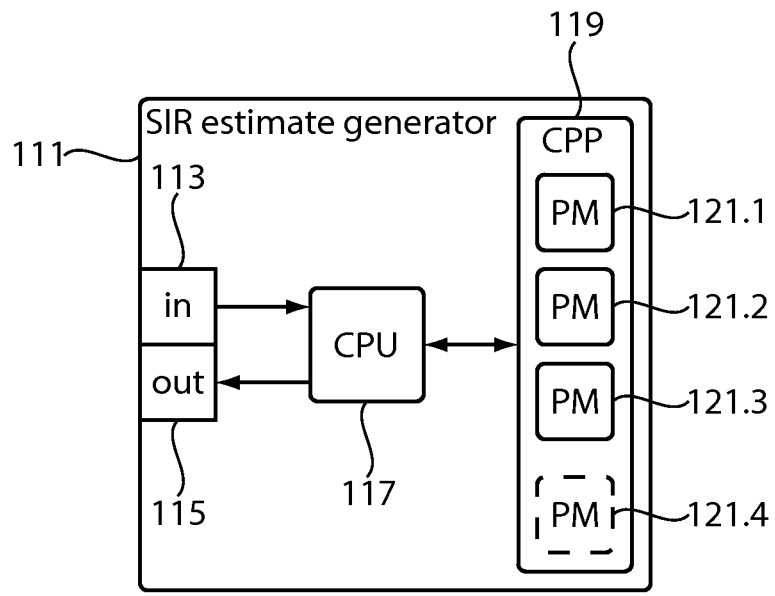
FIG. 6 is a block diagram illustrating a SIR estimate generator according to an embodiment of the invention.

FIG. 6 is block diagram illustrating a SIR estimate generator 111 according to another embodiment of the invention. The SIR estimate generator 111 is a processor based device and consequently comprises a CPU (Central Processing Unit) 117, which is connected to input and output interface equipment 113 and 115, respectively, and to a CPP (Computer Program Product) 119, such as a memory suitable for storing computer programs. The CPP 119 comprises various PMs (Program Modules) 121.1-121.4 for performing the functions of the SIR estimation process. The CPP comprises a first PM 121.1 with computer program code for performing the obtaining of input data corresponding to the block 83 of the method of FIG. 4. Consequently, the CPU 117 together with the CPP 119 and the PM 121.1 perform a function corresponding to the function performed by the obtaining unit 93 in the embodiment of FIG. 5. The CPP 119 further comprises a second PM 121.2 with computer program code for performing the calculation of an estimated SIR value corresponding to the block 85 of the method of FIG. 4. Consequently, the CPU 117 together with the CPP 119 and the second PM 121.2 perform a function corresponding to the function performed by the calculating unit 95 in FIG. 5. The CPP 119 also comprises a third PM 121.3 with program code for performing the function of providing a power controller with the estimated SIR value corresponding to the step 87 of the method in FIG. 4. Consequently, the CPU 117 together with the CPP 119 and the third PM 121.3 perform a function corresponding to the function of the providing unit 99 in FIG. 5. The CPP 119 comprises also a fourth optional PM 121.4, which may contain program code for performing additional tasks. For example, in a particular embodiment, the fourth PM 121.4 may contain program code for performing the power control based on the estimated SIR value, so that SIR estimator 111 also implements the power controller. The invention comprises also, as an embodiment of its own, the CPP 119 comprising at least the PMs 121.1-121.3.

The embodiments of SIR estimate generators disclosed and indicated above may advantageously be arranged in a base station, such as the base station 31, in order to perform SIR estimation as basis for power control, and the invention also comprises such a base station.

Simulations have been performed in order to compare the modified rscp-over-interference method with prior art methods. The simulations have been conducted in a WCDMA environment with realistic channel estimation, normal outer-loop power control procedure and a non-parametric GRAKE in the receiver. The simulations treat two cases. The first case is a higher data rate case where one UE is tested with E-TFCI=126, which corresponds to a peak data rate of 5.5 Mbps. The second case is a lower data rate case where the UE is tested with E-TFCI=42, which corresponds to a peak data rate of 255 Kbps, together with a very strong inter-cell interferer.

Figure 7:
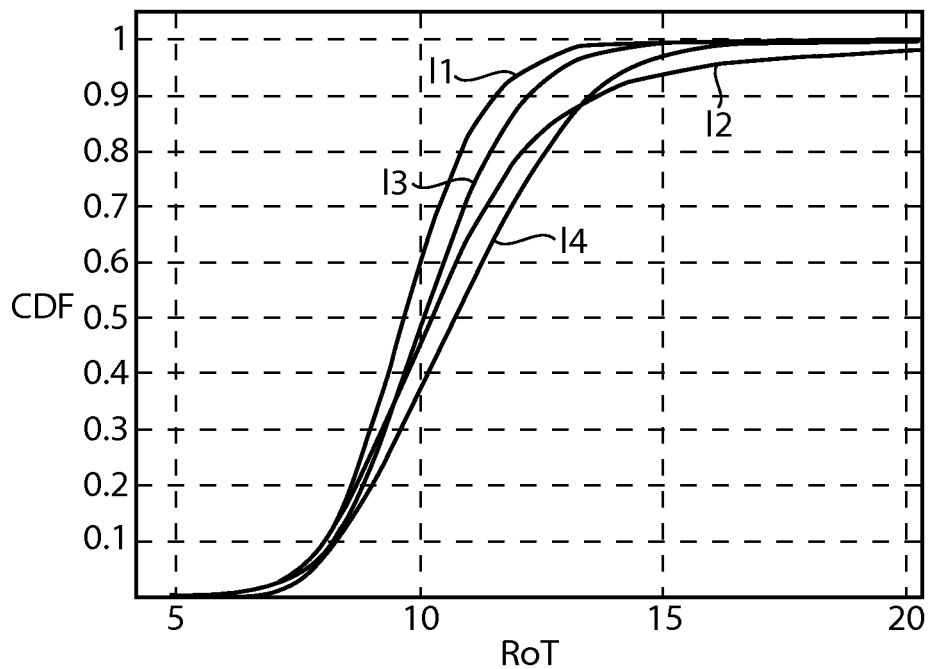
FIG. 7 is a diagram providing an RoT comparison between an embodiment of the invention and prior art methods in accordance with a simulated higher data rate case.

FIG. 7 is a diagram that shows a RoT (Rise over Thermal (noise)) comparison between the modified rscp-over-interference method and above-mentioned prior art methods in accordance with the first simulation case (higher data rates). In FIG. 7 CDF (Cumulative Distribution Function) versus RoT curves are shown the for the various methods: 11 is the curve associated with modified rscp-over-interference; 12 corresponds to p-over-variance; 13 to p-over-beta; and 14 to GRAKE SIR. FIG. 8 is table that shows the corresponding data throughput for the methods. It is clear that for this case, the modified rscp-over-interference method outperforms the other methods when it comes to control of RoT. At the same time, a satisfactory throughput is achieved. Compared with GRAKE SIR, modified rscp-over-interference provides a gain of about 2 dB at a 90-percentile. This implies a considerable increase in system capacity and/or decrease of power consumption in the UEs. The gain depends mainly on the fact that self-interference limitation induces the GRAKE SIR method to increase transmission power, as explained above. On the other hand, the GRAKE SIR method achieves a slightly higher throughput than the other methods.

For the lower data rate case, it turns out that the RoT behaviour is essentially the same for all the treated methods, which makes sense, since in this case, self-interference has negligible impact. The associated data throughput for this case is shown in table 9. Again, the GRAKE SIR method has the highest throughput, although all the methods provide satisfactory throughput.

There are many advantages associated with the various embodiments of the invention. One main advantage is that estimated SIR values are provided that makes power control more robust compared with the GRAKE SIR and other prior art methods; this applies in particular when a controlled transmitter, e.g. a UE, is self-interference limited. Simulation results also show that with realistic channel estimation algorithms etc. embodiments of the invention perform well both in scenarios with high self-interference and in scenarios with high inter-cell interference. The modified rscp-over-interference method do not need filtering of interference, a feature inherited from the GRAKE SIR method, and can therefore be regarded as a suitable choice for fast power control.

Above, the invention has been illustrated with various embodiments. These embodiments are, however, intended only as non-limiting examples, and the scope of protection is instead defined by the appending claims.

The invention claimed is:

1. A method for estimating a signal-to-interference-ratio (SIR) as a basis for transmit power control of a radio signal transmitted from a transmitter to a receiver over a radio channel, the method comprising:
    obtaining a channel estimate (h) of the radio channel;
    obtaining a combining weight (w); and
    generating an estimated SIR value based at least in part on the channel estimate (h) and the combining weight (w) such that the estimated SIR value equals a first estimated SIR value multiplied by a numerical factor, the numerical factor being dependent on the channel estimate (h) and the combining weight (w) such that the numerical factor attains a minimum value whenever the channel estimate and the combining weight are linearly dependent.

2. The method according to claim 1, wherein the minimum value is greater than or equal to one.

3. The method according claim 1, wherein the numerical factor comprises a numerical factor computed as a function of $$r \equiv \frac{\|h\| \cdot \|w\|}{|w^H \cdot h|}.$$

4. The method according to claim 3, wherein the numerical factor comprises an increasing function of r.

5. The method according to claim 3, wherein the numerical factor is proportional to $r^c$, where c comprises a positive real value.

6. The method according to claim 5, wherein the positive real value c equals two.

7. The method according to claim 1, wherein the first estimated SIR value comprises one of an estimated GRAKE SIR value, an estimated P-over-variance SIR value, and an estimated P-over-beta SIR value.

8. The method according to claim 1, further comprising providing the estimated SIR value to a power controller responsible for transmission power control of the transmitter.

9. A device configured to estimate a signal-to-interference-ratio (SIR) as basis for transmit power control of a radio signal transmitted from a transmitter to a receiver over a radio channel, the device comprising:
   an obtaining element configured to obtain a channel estimate (h) of the radio channel and to obtain a combining weight (w); and
   a calculating element operatively coupled to the obtaining element and configured to generate an estimated SIR value based on the channel estimate (h) and the combining weight (w) such that the estimated SIR value equals a first estimated SIR value multiplied by a numerical factor, the numerical factor being dependent on the channel estimate (h) and the combining weight (w) such that the numerical factor attains a minimum value whenever the channel estimate (h) and the combining weight (w) are linearly dependent.

10. The device according to claim 9, wherein the calculating element is further configured such that the minimum value of the numerical factor is greater than or equal to one.

11. The device according to claim 9, wherein the calculating element is further configured such that the numerical factor is computed as a function of $$r \equiv \frac{\|h\| \cdot \|w\|}{|w^H \cdot h|}.$$

12. The device according to claim 11, wherein the calculating element is further configured such that the numerical factor comprises an increasing function of r.

13. The device according to claim 12, wherein the calculating element is further configured such that the numerical factor is proportional to $r^c$, where c comprises a positive real value.

14. The device according to claim 13, wherein the calculating element is further configured such that the positive real value c equals two.

15. The device according to claim 9, wherein the calculating element is further configured such that the first estimated SIR value comprises one of an estimated GRAKE SIR value, an estimated P-over-variance SIR value, and an estimated P-over-beta SIR value.

16. The device according to claim 15, wherein the device is arranged in a base station for a radio access network.

17. The device according to claim 9, wherein the device further comprises a providing element operatively coupled to the calculating element and configured to provide the estimated SIR value to a power controller responsible for transmission power control of the transmitter.

18. A base station for a radio access network, the base station comprising a device configured to estimate a signal-to-interference-ratio (SIR) as a basis for transmit power control of a radio signal transmitted from the base station to a receiver over a radio channel, the device comprising:
   an obtaining element configured to obtain a channel estimate (h) of the radio channel and to obtain a combining weight (w); and
   a calculating element operatively coupled to the obtaining element and configured to generate an estimated SIR value based on the channel estimate (h) and the combining weight (w) such that the estimated SIR value equals a first estimated SIR value multiplied by a numerical factor, the numerical factor being dependent on the channel estimate (h) and the combining weight (w) such that the numerical factor attains a minimum value whenever the channel estimate (h) and the combining weight (w) are linearly dependent.

19. The base station according to claim 18, wherein the calculating element is further configured such that the minimum value of the numerical factor is greater than or equal to one.

20. The base station according to claim 18, wherein the calculating element is further configured such that the numerical factor is computed as a function of $$r \equiv \frac{\|h\| \cdot \|w\|}{|w^H \cdot h|}.$$

* * * * *

UNITED STATES PATENT AND TRADEMARK OFFICE
CERTIFICATE OF CORRECTION

| | | |
|---|---|---|
| PATENT NO. | : 8,862,175 B2 | Page 1 of 1 |
| APPLICATION NO. | : 13/516885 | |
| DATED | : October 14, 2014 | |
| INVENTOR(S) | : Bjorkegren et al. | |

It is certified that error appears in the above-identified patent and that said Letters Patent is hereby corrected as shown below:

On the Title Page, in Item (75), under "Inventors", in Column 1, Line 1, delete "Häkan" and insert -- Håkan --, therefor.

On the Title Page, in Item (75), under "Inventors", in Column 1, Line 1, delete "Töby" and insert -- Täby --, therefor.

In the Specification

In Column 2, Line 25, delete "form" and insert -- from --, therefor.

In Column 4, Line 19, delete "FIG. 1 is" and insert -- FIG. 1 is a --, therefor.

In Column 4, Line 26, delete "FIG. 4 is" and insert -- FIG. 4 is a --, therefor.

In Column 4, Line 35, delete "FIG. 8 is" and insert -- FIG. 8 is a --, therefor.

In Column 4, Line 38, delete "FIG. 9 is" and insert -- FIG. 9 is a --, therefor.

In Column 7, Line 16, Equation (5), delete "$K=\|h\|^2 \cdot \|w\|^2 / \|w^H \cdot h\|^2.$" and insert -- $K = \|h\|^2 \cdot \|w\|^2 / \|w^H \cdot h\|^2.$ --, therefor.

In Column 9, Line 23, delete "FIG. 6 is" and insert -- FIG. 6 is a --, therefor.

In the Claims

In Column 11, Line 6, in Claim 3, delete "according claim" and insert -- according to claim --, therefor.

Signed and Sealed this
Twenty-third Day of June, 2015

Michelle K. Lee
*Director of the United States Patent and Trademark Office*